US005789259A

United States Patent [19]

Wardlaw

[11] Patent Number: 5,789,259

[45] Date of Patent: Aug. 4, 1998

[54] METHOD AND APPARATUS FOR MIXING SAMPLES IN A CAPILLARY TUBE

[75] Inventor: Stephen C. Wardlaw, Old Saybrook, Conn.

[73] Assignee: Robert A. Levine, Guilford, Conn.

[21] Appl. No.: 724,014

[22] Filed: Sep. 27, 1996

[51] Int. Cl.$^6$ ..... G01N 1/00; G01N 1/38

[52] U.S. Cl. ..... 436/177; 436/174; 436/179; 436/180; 436/45; 422/72; 422/99; 422/100; 422/104; 366/213; 366/218; 494/16

[58] Field of Search ..... 436/45, 177, 174, 436/179, 180, 183; 422/72, 99, 100, 101, 104; 210/513, 782; 494/16; 366/213, 208, 209, 218

[56] References Cited

U.S. PATENT DOCUMENTS 3,268,160 8/1966 Talley ..... 494/16
4,027,660 6/1977 Wardlaw et al. ..... 128/2 F
4,835,106 5/1989 Johnson et al. ..... 436/45
5,173,262 12/1992 Butis et al. ..... 422/72
5,279,150 1/1994 Katzer et al. ..... 73/61.66

*Primary Examiner*—Long V. Le
*Attorney, Agent, or Firm*—William W. Jones

[57] ABSTRACT

A transparent capillary tube containing a blood sample, a float, an anticoagulant plus other reagents, is centrifuged in a centrifuge so as to cause the various blood sample constituents such as cells and the like to gravimetrically separate out in the tube. The blood sample is drawn into the tube which already contains the float and reagents. In order to ensure proper mixing of the blood and the reagents in the tube, the tube is periodically centrifuged in opposite directions so that the various formed components in the blood and the float will gravitate first toward one end of the tube and then toward the opposite end of the tube. The tube will preferably be contained in a cassette which is removably positioned on the centrifuge platen.

11 Claims, 5 Drawing Sheets

METHOD AND APPARATUS FOR MIXING SAMPLES IN A CAPILLARY TUBE

TECHNICAL FIELD

This invention relates to a method and apparatus for ensuring homogeneous admixture of a blood sample with reagents in a capillary tube. More particularly, this invention relates to a method and apparatus for ensuring that reagents which are preloaded into the tube will be homogeneously admixed with blood which is later drawn into the tube.

BACKGROUND ART

In a large vessel, it is relatively easy to mix materials such as a blood sample and one or more reagents. In a large diameter tube, the sample can be easily mixed by inverting the tube whereupon mutual displacement of the sample and air provides both linear and turbulent fluid flow, thus affecting the sample-reagent mixing. When the sample is entirely confined within a small diameter tube, the aforesaid normal mixing within the confines of the tube will not occur because the tube diameter is too small for effective displacement of air and sample. This problem is exacerbated if the tube also contains a closely-fitting float, such as is described in U.S. Pat. No. 4,027,660, granted Jun. 7, 1977 to Stephen C. Wardlaw et al.

The sample and reagents can be effectively mixed in a capillary tube if the float and cap are left out the tube, and the tube is manually inverted by a technician to cause the sample to flow back and forth in the tube, thus dissolving any coated reagent or reagents and admixing the reagents with the sample. The disadvantage with this approach to the problem of mixing a sample and reagents in a capillary or other small diameter tube, is that it requires specialized operator training; and it also has the potential of allowing blood or other sample to spill from the tube as the mixing is accomplished. The aforesaid mixing solution is also undesirable from a technician's standpoint due to the potential of direct exposure to the blood sample. There is also a problem with the reproducibility of the mixing results among different technicians, which can affect the accuracy of the sample analysis. In tubes with a diameter below about 3mm, capillary forces prevent adequate mixing due to inadequate displacement of air and sample in the tubes at normal G forces. Sample and reagent mixing can be accomplished in the small diameter tube by tapping or by violently shaking the tube so as to provide transient sample accelerations which are greater than those provided by the normal G forces. This approach is undesirable due to the need for a technician to manually shake the tube.

In certain cases, it may be necessary to continue sample mixing beyond the point where the reagents have dissolved, as may be the case when it is necessary for the cells in the sample to actually come into contact with insoluble reagent particle surfaces; other cell surfaces; or some other surface with which the cells will react, or interact. In such cases, prolonged mixing may be required in order to ensure that all of the cells in the sample have had an adequate opportunity to contact such other reaction surfaces in the sample.

It would therefore be desirable to provide a method and apparatus for ensuring a homogeneous admixture of a sample with preloaded reagents in a small diameter tube.

DISCLOSURE OF THE INVENTION

This invention relates to a method and apparatus for ensuring essentially complete admixture of a sample, such as a blood sample with reagents in small diameter tubes. The method and apparatus of this invention provide for oppositely vectored g-forces which are automatically imposed on the sample and reagents in the tube, prior to final centrifugal separation of the sample constituents. The technician simply places the sample tube in a centrifuge formed in accordance with this invention, and starts the centrifuge. Thus, there are no separate individualized steps for the technician to perform. Because the centrifuge speed and acceleration of the centrifuge platen can be precisely controlled, the sample and reagent mixing will be uniform and homogeneous. The controlled mixing of the sample and reagents is accomplished by reversing the direction of sample centrifugation after the sample has been placed in the centrifuge without subsequent technician intervention.

It is therefore an object of this invention to provide a method and apparatus for easily and automatically intimately mixing samples in small diameter closed tube systems.

It is a further object of this invention to provide a method and apparatus of the character described wherein the direction of centrifugal forces imposed on a centrifuge tube is periodically reversed during centrifugation so as cause the sample components, the float, and reagents in the tube to gravitate in opposite directions in the tube.

It is an additional object of this invention to provide a method and apparatus of the character described wherein the position of the centrifuge tube is periodically inverted in the centrifuge platen during centrifugation.

These and other objects and advantages of the invention will become more readily apparent from the following detailed description of the invention when taken in conjunction with the accompanying drawings, in which:

BEST MODE FOR CARRYING OUT THE INVENTION

Figure 1:
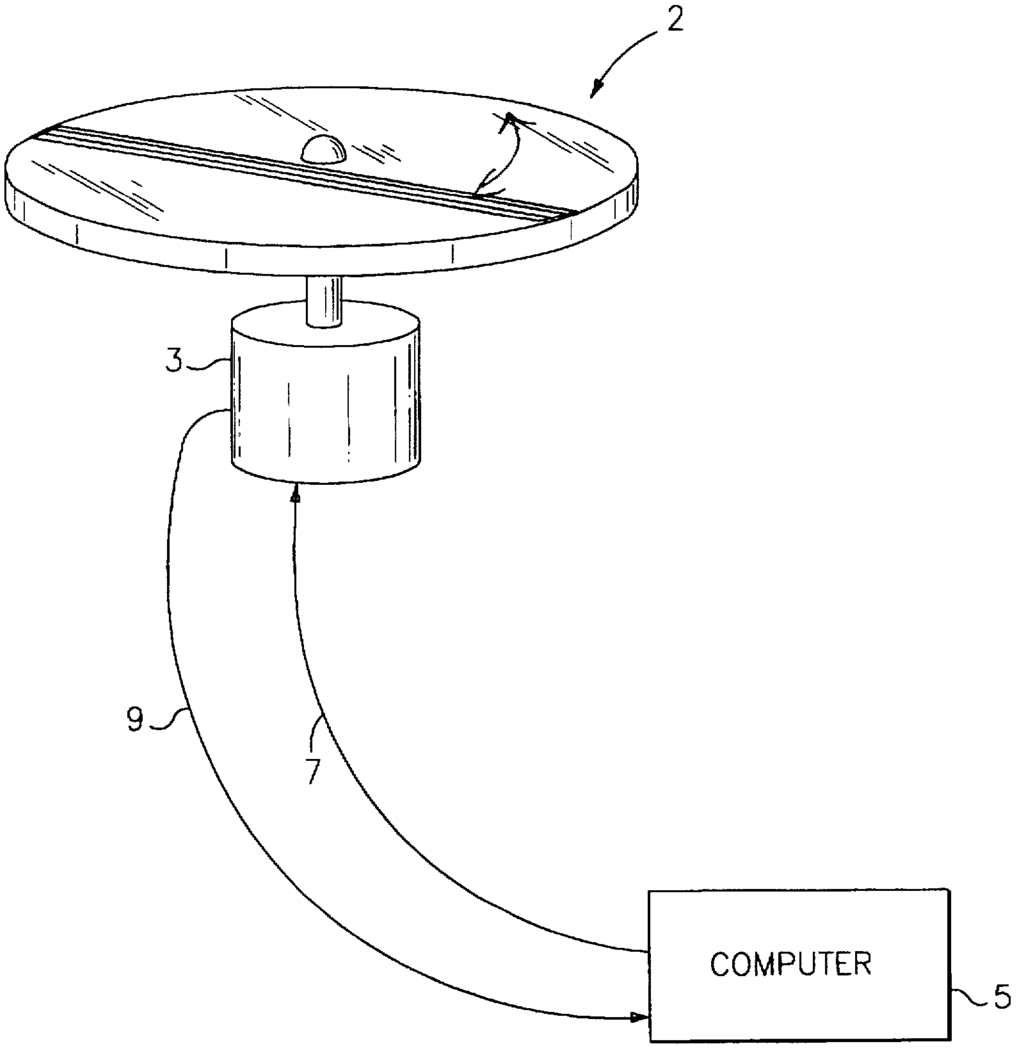
FIG. 1 is a schematic view of a centrifuge assembly formed in accordance with this invention.

Referring now to the drawings, there is shown in FIG. 1 a schematic representation of a centrifuge platen 2, its driving motor 3, and a preprogrammed centrifuge microprocessor controller 5. The controller 5 senses the direction and rotational speed of the platen 2 through line 9, and controls the direction of rotation and rotational speed of the platen 2 through line 7. During operation of the system, the controller 5 will periodically reverse the direction of rotation of the platen 2 as explained hereinafter.

Figure 2:
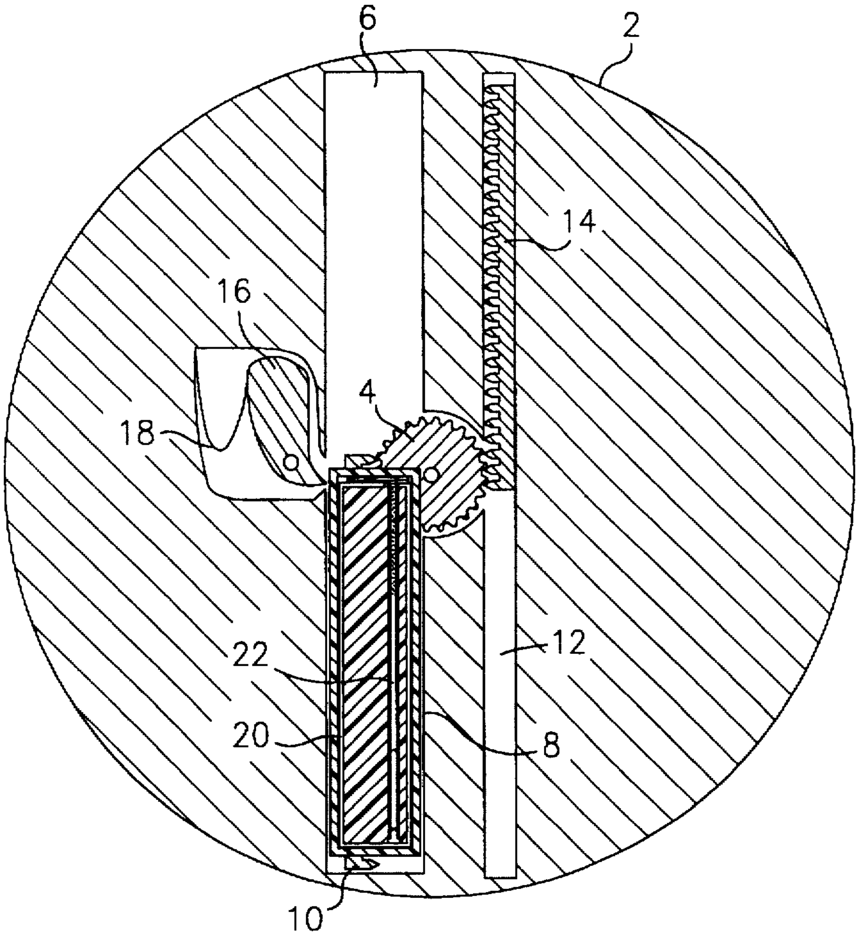
FIG. 2 is a schematic view of a centrifuge platen, having a freely rotatable but axially fixed gear at its center.

In FIG. 2, there is shown a schematic view of a centrifuge platen 2, having a freely rotatable but axially fixed gear 4 at its center. A slot 6 in the platen accepts a carrier 8, which is freely reciprocally movable in the slot 6. A rack gear 10 engages the central gear 4. The rack gear 10 is also connected to the sample tube carrier 8. In operation, a cassette 20 containing a sample tube 22 is placed in the carrier 8 by the operator.

In order to reduce any rotational imbalance during the mixing process, it may be desirable in certain instances to provide a second rack gear 14 which is also engaged by the central gear 4 and which rack gear 14 rides in a second slot 12 in the platen 2. In order to prevent reversal of the direction of movement of the carrier 8 at high speed, a pawl 16 tensioned by a spring 18 may be included so that a tooth 17 on the pawl 16 bears against the carrier 8 to hold the carrier 8 in place when the centrifuge platen 2 is spinning rapidly. It should be noted that the counterweight rack 14 is only required if imbalance is severe during the mixing process. If the mixing of a particular class of sample can be accomplished at a lower centrifuge speeds, thus any resultant spin imbalance may not cause harmful effects, such as severe vibration of the centrifuge, and the counterweight rack 14 may be omitted from the assembly. The retaining pawl 16 will likewise only be needed to prevent violent reversals of direction of movement the carrier 8 during the mixing step. Thus the retaining pawl 16 may not be necessary if the sample can be adequately mixed at low centrifuge speeds, such as less than about 1,000 RPM.

Figure 3:
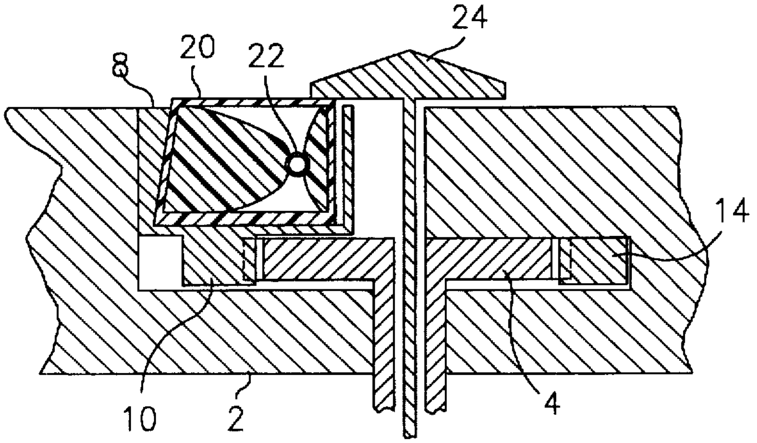
FIG. 3 is a cross-sectional view through the center of the gear and perpendicular to the sample tube-containing platen slot.

FIG. 3 is a cross-sectional view through the center of gear 4 and perpendicular to slot 6. When the lid of the centrifuge is closed, a freely rotatable cap 14 is pressed lightly on the top of cassette 20 by the impingement by the closure of the centrifuge lid, thus ensuring entrapment of the cassette in the carrier 8 during the mixing and centrifugation processes.

Figure 5:
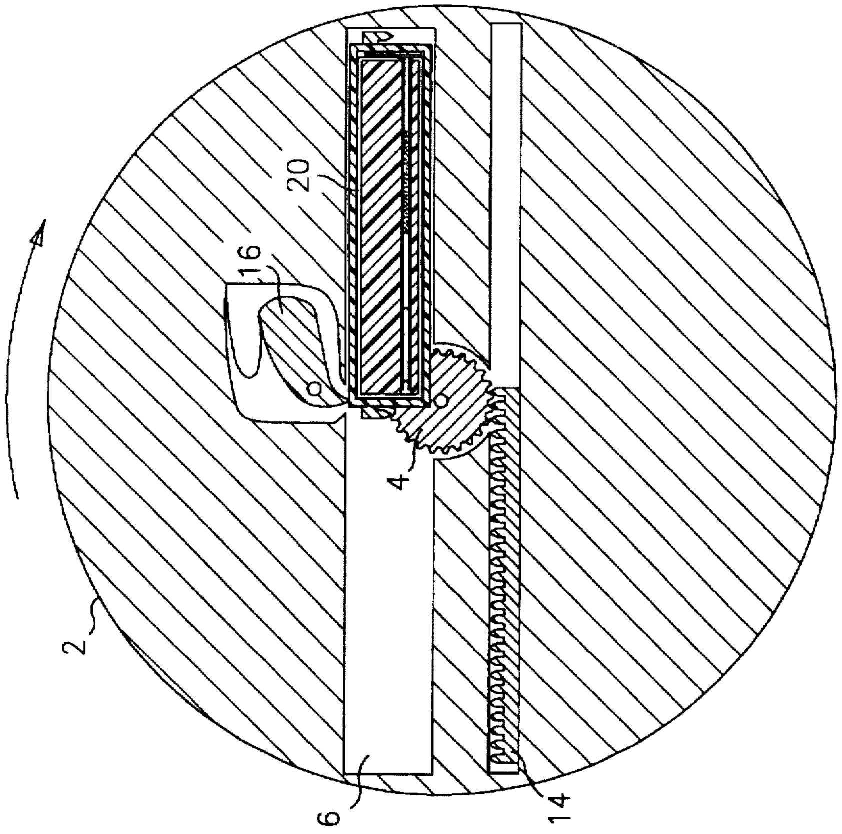
FIGS. 4 and 5 show the results of rotating the gear in opposite directions.
Figure 4:
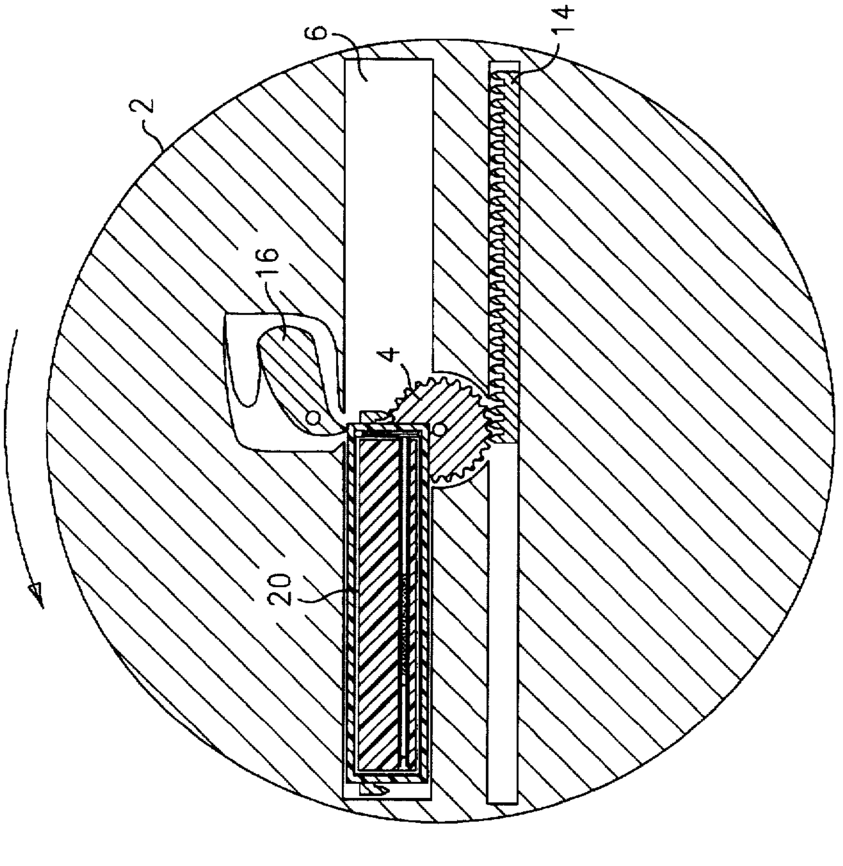

To effect mixing, the direction of rotation of the gear 4 is periodically reversed. FIGS. 4 and 5 show the results of this periodic reversal sequence, and how it enhances the mixing process. When the central gear 4 is rotated counterclockwise, since it is freely rotatable in platen 2, the platen 2 itself will not rotate until the carrier 8 moves to the end of the slot 6. Further rectilinear movement of the carrier 8 will then be prevented and the rotational movement of the gear 4 will be transmitted to the platen 2 so as to cause the platen 2 to rotate in the counterclockwise direction. When the speed of the centrifuge increases above several hundred RPM, the pawl 16 will engage the carrier 8. As the centrifuge speed further increases, heavier components in the tube 22 will be thrust radially outwardly by centrifugal force. Once this occurs, the gear 4 is braked, and is then rotated in the clockwise direction as shown in FIG. 5. When the centrifuge speed slows, the pawl 16 disengages from the carrier 8 so as to allow the carrier 8 to move to the opposite side of the slot 6. The centrifuge again accelerates so as to thrust the heavier components of the sample to the opposite end of the tube 22. These centrifuge reversal cycles may be repeated as often as required to thoroughly admix the sample and reagents in the tube 22. Once complete sample and reagent admixture is accomplished, the centrifuge speed can be increased so as to proceed with gravimetric sample constituent layer separation.

Figure 6:
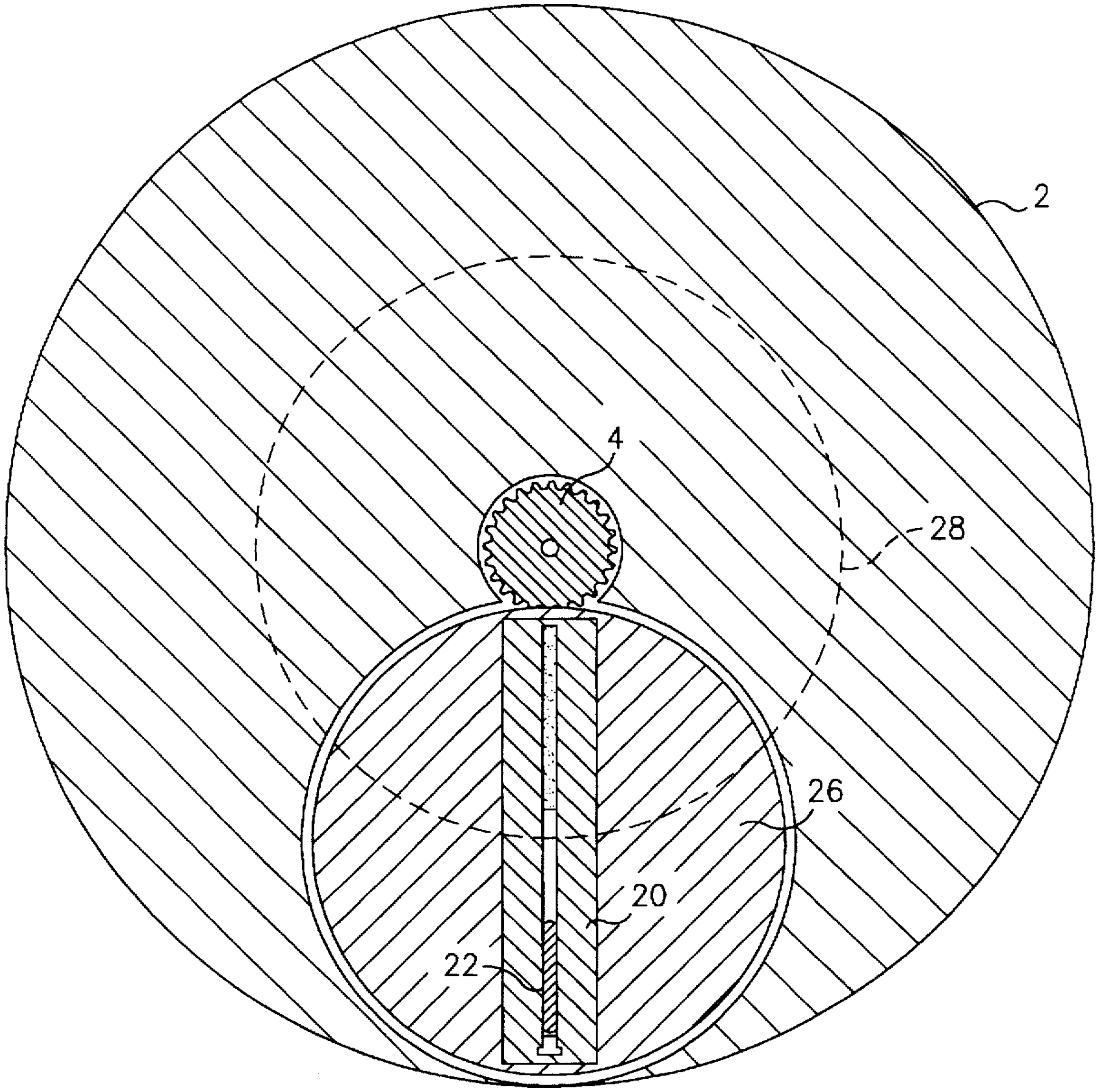
FIG. 6 is a schematic form of a second embodiment of a sample-reagent mixing centrifuge formed in accordance with this invention.
Figure 7:
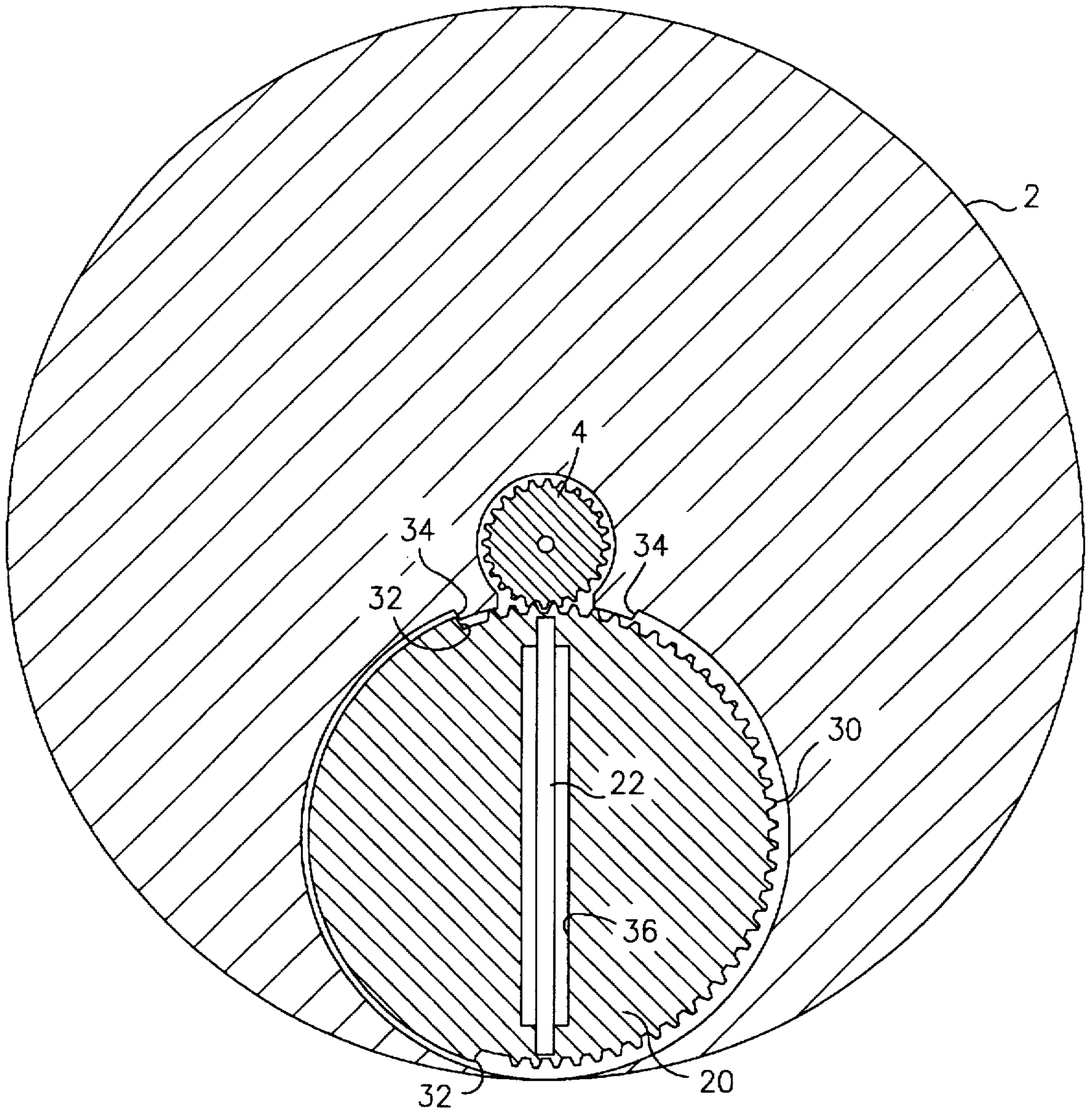
FIG. 7 is a sectional view of the assembly of FIG. 6 taken internally of the centrifuge platen.

An alternative embodiment of a mixing centrifuge assembly is shown in schematic form in FIG. 6. In this embodiment, the centrifuge platen 2 also has a freely rotatable but axially fixed gear 4 at its center. A disc 26 is rotatably mounted on the platen 2, and supports a cassette 20 for holding the sample tube 22. Shown in phantom lines, a rotatable cover 28 holds the cassette 20 firmly on the platen 2. FIG. 7 is a sectional view of the assembly of FIG. 5 taken internally of the platen 2. As shown in FIG. 7, the disc 26 has gear teeth 30 which engage the central gear 4. Rotation of the disc 26 is limited to about 180° by engagement between bosses 32 on the disc 26 and bosses 34 on the platen 2. Thus when the direction of rotation of the central gear 4 is reversed, the disc 26 will be rotated through an angle of about 180° until a boss 32 on the disc 26 engages a mating boss 34 on the platen 2. Once the bosses 32 and 34 engage, the sample will be centrifuged. A rectangular aperture 36 can be formed in the disc 26 so as to allow the contents of the tube 22 to be viewed in the disc 26 during centrifugation by a reading mechanism of the type described in co-pending application Attorney's Docket No. H-1219. As with the first embodiment of the invention described above, a pawl or catch may be desirable in order to prevent reversal of the disc 26 at higher RPM centrifuge speeds.

It will be readily appreciated that the assembly of this invention will achieve proper admixture of the sample and any reagents in the small bore tube without manual interference by the operator. The assembly can be used to thoroughly mix the sample and to then centrifuge the mixed sample in continuing steps, without having to remove the sample from the assembly. If combined with a reading device, the assembly can also be used to analyze the gravimetric separation of the components of the sample during centrifugation.

Since many changes and variations of the disclosed embodiments of the invention may be made without departing from the inventive concept, it is not intended to limit the invention otherwise than as required by the appended claims.

What is claimed is:

1. An assembly for intermixing a biological specimen sample with reagents contained in a capillary tube during centrifugation of the tube in the assembly, said assembly comprising:

a) a centrifuge having a platen;

b) a recess in said platen sized to receive a capillary tube carrier which is adapted to carry a capillary tube, said recess extending from substantially one edge of said platen to an essentially diametrically opposite edge of said platen;

c) a capillary tube carrier mounted in said platen recess and movable from one end of said recess to an opposite end thereof, said capillary tube carrier having an end wall which prevents expulsion of a specimen sample from a capillary tube positioned in said carrier; and d) means in said centrifuge for selectively moving the capillary tube carrier from said one end of said recess to said opposite end of said recess so that when a capillary tube containing a sample and reagents is disposed in the carrier, the sample and reagents will be centrifuged first toward one end of the capillary tube and thereafter toward an opposite end of the capillary tube so as to intermix the sample and reagents in the capillary tube.

2. An assemblage for intermixing a biological specimen sample with reagents contained in a capillary tube assembly during centrifugation of the capillary tube assembly in the assemblage, said assemblage comprising:

a) a centrifuge having a platen; and b) a capillary tube assembly carrier mounted on said platen and movable on said platen in a manner which, when a capillary tube assembly containing a sample and reagents is disposed in the carrier, will cause the sample and reagents to be centrifuged first toward one end of the capillary tube assembly and thereafter toward an opposite end of the capillary tube assembly so as to centrifugally intermix the sample and reagents in the capillary tube assembly while the capillary tube assembly is being centrifuged, said capillary tube assembly carrier having an end wall which prevents expulsion of a specimen sample from a capillary tube positioned in said carrier.

3. The assembly of claim 2 wherein said platen includes a recess which extends from substantially one edge of said platen to an essentially diametrically opposite edge of said platen; and said carrier includes a toothed rack mounted in said recess, said toothed rack being selectively reciprocally movable between opposite ends of said recess.

4. The assembly of claim 3 wherein said centrifuge includes a central toothed gear mounted on a platen-driving shaft in the centrifuge, said central gear engaging said toothed rack so as to provide a driving connection with said toothed rack operable to drive said toothed rack through said recess at times when the direction of rotation of said platen is reversed.

5. The assembly of claim 4 further comprising a ballast toothed rack movably mounted on said platen, said ballast toothed rack being selectively positionable on said platen so as to counteract any rotational imbalance in said platen which might result from reciprocating movement of said toothed rack on said platen.

6. The assembly of claim 4 further including a cap mounted on said platen-driving shaft and overlying said tube assembly, said cap being selectively operable to fasten said tube assembly on said carrier.

7. The assembly of claim 2 further comprising a pawl mounted on said platen, said pawl being operable to engage said carrier to selectively hold said carrier in place on said platen when said platen is spinning.

8. The assembly of claim 7 wherein said pawl is spring biased so as to release said carrier when said platen is not spinning.

9. An assemblage for intermixing a biological specimen sample with reagents contained in a capillary tube assembly during centrifugation of the tube in the assemblage, said assemblage comprising:

a) a centrifuge having a platen; and b) a circular capillary tube assembly carrier mounted on said platen and selectively rotatable on said platen in a manner which, when a capillary tube assembly containing a sample and reagents is disposed in the carrier, will cause the sample and reagents to be centrifuged first toward one end of the capillary tube assembly and thereafter toward an opposite end of the capillary tube assembly so as to centrifugally intermix the sample and reagents in the capillary tube assembly while the capillary tube assembly is being centrifuged, said capillary tube assembly carrier having an end wall which prevents expulsion of a specimen sample from a capillary tube positioned in said carrier.

10. A method for intermixing a biological specimen sample with reagents in a capillary tube during centrifugation of the sample in the tube, said method comprising the steps of:

a) providing a centrifuge including a platen having a recess in said platen which is sized to snugly receive a capillary tube carrier which is adapted to hold a capillary tube, said recess extending from substantially one edge of said platen to an essentially diametrically opposite edge of said platen;

b) positioning a capillary tube carrier containing a capillary tube which is filled with said sample and reagents in said platen recess and periodically moving said capillary tube carrier from one end of said recess to an opposite end thereof so that the sample and reagents will be centrifuged first toward one end of the capillary tube and thereafter toward an opposite end of the capillary tube so as to intermix the sample and reagents in the capillary tube; and c) preventing the sample and reagents from being expelled from the capillary tube during centrifugation of the capillary tube and sample.

11. A method for intermixing a biological specimen sample with reagents in a capillary tube during centrifugation of the sample in the tube, said method comprising the steps of:

a) providing a centrifuge having a reversible platen with a recess which is sized to receive the capillary tube; and b) positioning the capillary tube in said platen recess, and periodically reversing the direction of centrifugation of the sample and reagents in the tube so that the capillary tube will be periodically re-oriented relative to the platen and so that the sample and reagents will be centrifuged first toward one end of the capillary tube and then toward an opposite end of the capillary tube so as to intermix the sample and the reagents within the capillary tube and c) preventing the sample and reagents from being expelled from the capillary tube during centrifugation of the capillary tube and sample.

* * * * *